US009838924B2

(12) United States Patent
Zhu et al.

(10) Patent No.: US 9,838,924 B2
(45) Date of Patent: Dec. 5, 2017

(54) METHOD AND DEVICE FOR PROCESSING INTER-SYSTEM RESELECTION OR SWITCH (71) Applicant: Datang Mobile Communications Equipment Co., Ltd, Beijing (CN)

(72) Inventors: Yafeng Zhu, Beijing (CN); Hua Tian, Beijing (CN)

(73) Assignee: DATANG MOBILE COMMUNICATIONS EQUIPMENT CO., LTD, Beijing (CN)

( * ) Notice: Subject to any disclaimer, the term of this patent is extended or adjusted under 35 U.S.C. 154(b) by 0 days.

(21) Appl. No.: 14/765,780

(22) PCT Filed: Jan. 9, 2014

(86) PCT No.: PCT/CN2014/070421
§ 371 (c)(1),
(2) Date: Aug. 4, 2015

(87) PCT Pub. No.: WO2014/194672
PCT Pub. Date: Dec. 11, 2014

(65) Prior Publication Data
US 2016/0286440 A1    Sep. 29, 2016

(30) Foreign Application Priority Data
Jun. 3, 2013    (CN) .......................... 2013 1 0217540

(51) Int. Cl.
*H04W 4/00* (2009.01)
*H04W 36/00* (2009.01)
(Continued)

(52) U.S. Cl.
CPC ...... *H04W 36/0066* (2013.01); *G06F 3/0482* (2013.01); *G06F 3/04842* (2013.01); *H04L 61/2007* (2013.01)

(58) Field of Classification Search
None
See application file for complete search history.

(56) References Cited

U.S. PATENT DOCUMENTS

2014/0153544 A1* 6/2014 Lu .......................... H04W 8/26
370/331

FOREIGN PATENT DOCUMENTS

| CN | 102695234 | 9/2012 |
| CN | 102740361 A | 10/2012 |
(Continued)

OTHER PUBLICATIONS

3GPP TS 29.274 v10.3.1, Release 10, Aug. 2011, pp. 1-186.*
(Continued)

*Primary Examiner* — Nicholas Sloms
(74) *Attorney, Agent, or Firm* — John P. White; Cooper & Dunham LLP (57) ABSTRACT The present invention discloses a processing method and device for reselecting or switching UE from a TD-SCDMA system to a TD-LTE system. The method includes: receiving, by a PGW, a modify bearer request message sent by an SGW; obtaining, by the PGW, an S5/S8 interface resource in current bearer context information, updating the bearer context information according to the modify bearer request message, and obtaining an S5/S8 interface resource in the updated bearer context information; when the PGW determines that the S5/S8 interface resource changes according to the S5/S8 interface resource in the updated bearer context information and the interface resource in the current bearer context information, sending back, by the PGW, a modify bearer response message carrying the S5/S8 interface resource in the updated bearer context information to the SGW, for enabling the SGW to update the bearer context information according to the modify bearer response message. In the present invention, the scenarios supported by the existing protocol are perfected, and support is provided for reselecting or switching the UE from the TD-SCDMA system to the TD-LTE system and processing under sce-
(Continued)

narios in which the S5/S8 interface and the Gn/Gp interface are in different networks.

2 Claims, 3 Drawing Sheets

(51) Int. Cl.
*G06F 3/0482* (2013.01)
*G06F 3/0484* (2013.01)
*H04L 29/12* (2006.01)

(56) References Cited

FOREIGN PATENT DOCUMENTS

| CN | 102791010 A | 11/2012 |
|---|---|---|
| CN | 103338487 A | 10/2013 |
| WO | WO 2010/126326 A2 | 11/2010 |

OTHER PUBLICATIONS

International Search Report, dated Apr. 3, 2014 in connection with PCT International Application No. PCT/CN2014/070421, filed Jan. 9, 2014.
Written Opinion of the International Searching Authority, dated Apr. 3, 2014 in connection with PCT International Application No. PCT/CN2014/070421, filed Jan. 9, 2014.

* cited by examiner

Figure 1

Prior Art

Figure 2

Prior Art

METHOD AND DEVICE FOR PROCESSING INTER-SYSTEM RESELECTION OR SWITCH

CROSS-REFERENCE TO RELATED APPLICATIONS

This application is a §371 national stage of PCT International Application No. PCT/CN2014/070421, filed Jan. 9, 2014, claiming priority of Chinese Patent Application No. 201310217540.0, filed Jun. 3, 2013, the contents of each of which are hereby incorporated by reference in their entirety.

TECHNICAL FIELD

The present invention relates to the technical field of wireless communications, and particularly relates to a method and device for processing inter-system reselection or switch. The present application claims the priority of prior application with Application No. 201310217540.0, filed on Jun. 3, 2013, and entitled "METHOD AND DEVICE FOR PROCESSING INTER-SYSTEM RESELECTION OR SWITCH".

BACKGROUND

When user equipment (User Equipment, UE) is reselected from a time division duplex-synchronous (Time Division Duplex-Synchronous CDMA, TD-SCDMA) system to a long term evolution (Long Term Evolution, TD-LTE) system, a core network needs to process a tracking area update (Tracking Area Update, TAU) flow. After receiving a modify bearer request (Modify Bearer Request) message, a packet data network (Packet Data Network, PDN) gateway (PDN Gateway, PGW) updates user position information and updates the position information of a serving gateway (Serving Gate Way, SGW), meanwhile, a network element property is switched from a gateway general packet radio service (General Packet Radio Service, GPRS) support node (Gateway GPRS Support Node, GGSN) to the PGW, if the IP addresses of an S5/S8 interface between the SGW and the PGW and a Gn/Gp interface between the GGSN and a service GPRS supporting node (Service GPRS Supporting Node, SGSN) are different (e.g., the S5/S8 interface and the Gn/Gp interface are in different networks), a S5/S8 signaling plane address of the PGW will change, and user plane resources need to be reselected.

But according to a 29274 GTPC (GTP Control Plane, wherein GTP refers to a GPRS Tunneling Protocol) protocol, in a modify bearer response (Modify Bearer Response) message, the control plane and user plane address information of the PGW (a control plane IF address of an interface connecting the PGW with the SGW, a user plane IP address and a tunnel endpoint identifier (Tunnel Endpoint Identifier, TEID, including user plane TEID (TEIDU) and control plane TEID (TEIDC)) could not be responded to an SGW network element, and the SGW and a mobility management entity (Mobility Management Entity, MME) still store old GGSN/PGW addresses in instance areas in a TAU process.

Specifically, in a 23401 protocol, according to protocol description, the TAU process is specifically as follows:
1. the SGW (reselected SGW, namely, new SGW) notifies the PGW of user. equipment (User Equipment, UE) position information and change of a radio access type (Radio Access Type, RAT) type (type) through an update bearer request (Update Bearer Request) message. Wherein, the update bearer request message carries an SGW address, the TEID of the SGW side and RAT type information.
2. If a dynamic policy control and charging (Policy Control and Charging, PCC) rule is configured, and the PGW needs to notify a policy and charging rules function (Policy And Charging Rules Function, PCRF) of the UE position information and the RAT type information, the PGW triggers an IP-connectivity access network (IP-Connectivity Access Network, IP-CAN) session modification flow and notifies the PCRF of the UE position information and the RAT type information,
3. The PGW updates a bearer context and responds an update bearer response (Update Bearer Response) message. Wherein, the update bearer response message carries a mobile station ISDN number (MSISDN), a PGW address and the TEID of the PGW side.
4. The SGW (new SGW) updates the bearer context. After receiving a protocol data unit (Protocol Data Unit, PDU) of an eNodeB (eNodeB, eNB), the SGW starts to send bearer data to the PGW.
5. The SGW (new SGW) responds a create bearer response (Create Bearer Response) to the MME (reselected MME, namely new MME). Wherein, the create bearer response message carries the SGW address, the TEID of the SGW side, the PGW address and the TEID of the PGW side.

Figure 1:
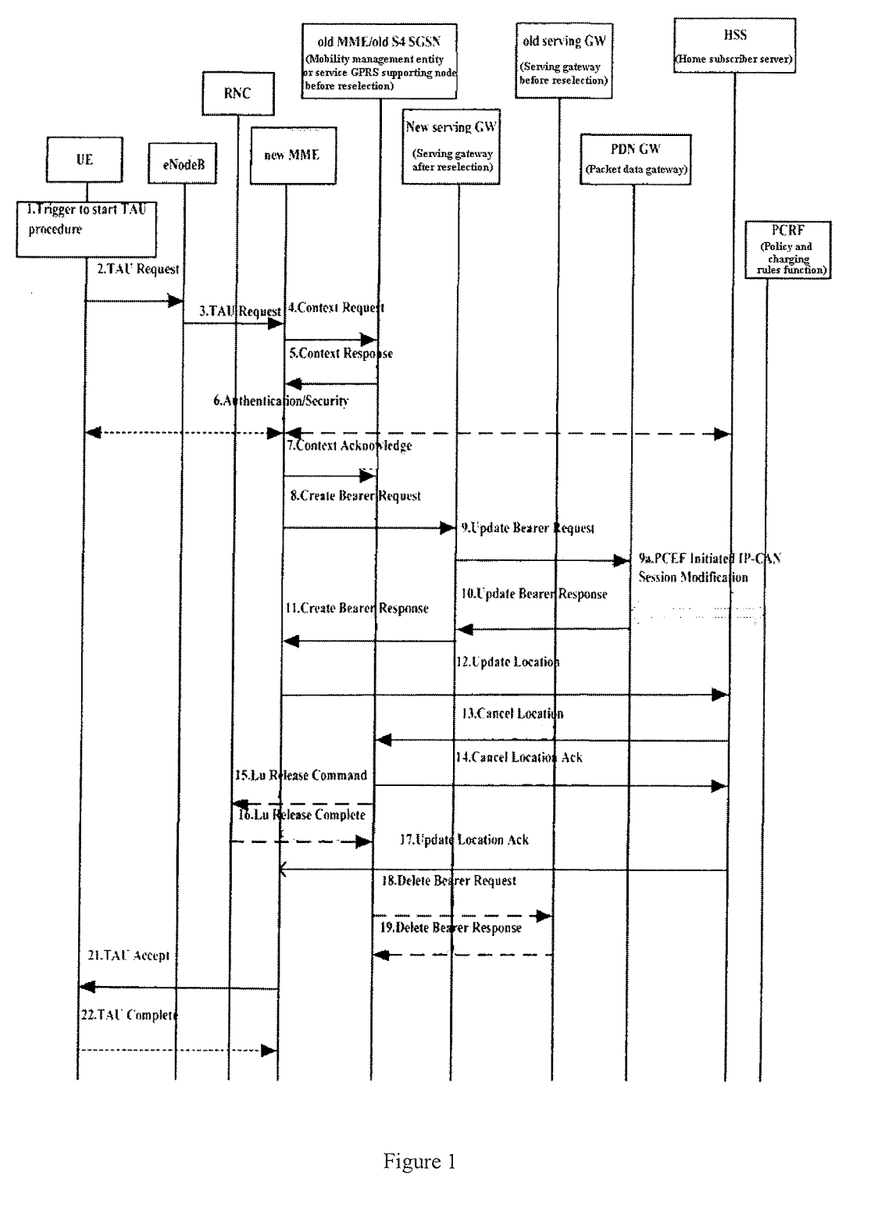
FIG. 1 is a schematic diagram of signaling interaction of a TAU flow of reselecting a user from a TD-SCDMA system to an LTE system in the prior art.

The schematic diagram of the specific flow (a TAU flow of reselecting a user from 3G to an LTE network) may be as shown in FIG. 1.

In addition, in the prior art, when the UE is switched from the TD-SCDMA system to the LTE system, if the IP addresses of the S5/S8 interface between the SGW and the PGW and the Gn/Gp interface between the GGSN and the SGSN are different (e.g., the S5/S8 interface and the Gn/Gp interface are in different networks), problems similar to those in the TAU process also exist.

Specifically, according to the protocol description, the process of switching the UE from the TD-SCDMA system to the LTE system is specifically as follows:
1. a Target (target) MME (switched MME) sends an update bearer request message to a Target SGW, wherein the update bearer request message carries an IP and an TEID allocated by a Target eNodeB to an S1-U;
2. the Target SGW sends an update bearer request to the PGW (the update bearer request carries an SGW address, TEID of an SGW side, a RAT type and APN-AMBR), after receiving the update bearer request message, the PGW updates the context thereof and sends back an update bearer response (Update Bearer Response) message. At this time, a downlink channel is switched to the target side.

If dynamic PCC is deployed, the PGW initiates an IP-CAN session modification to notify the PCRF of the changed information, for example, RAT change.
3. The Target SGW sends back the update bearer response message to the Target MME.

Figure 2:
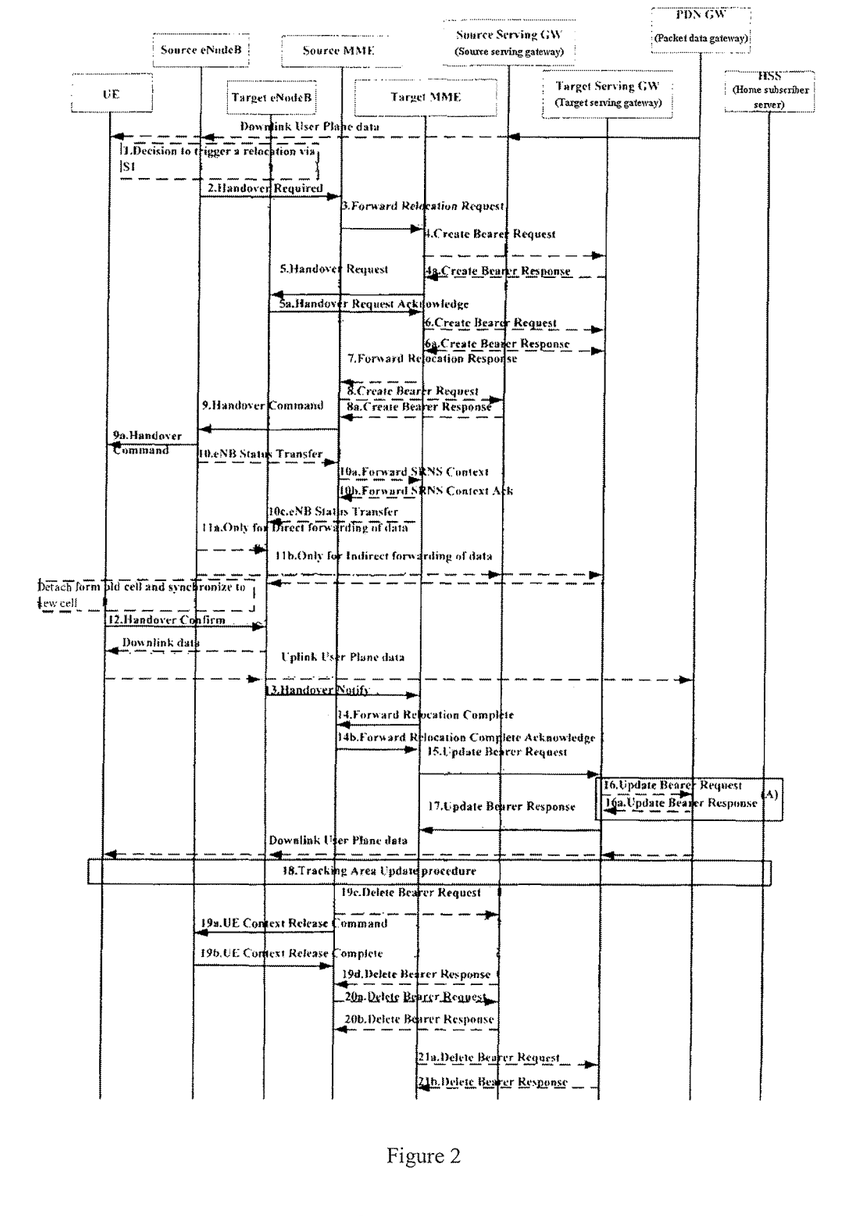
FIG. 2 is a schematic diagram of signaling interaction of a switching flow of switching a user from a TD-SCDMA system to an LTE system in the prior art.

The schematic diagram of the specific flow (a flow of switching the user from UTRAN to the LTE network) may be as shown in FIG. 2.

Wherein, during the TAU process and the switching process described in the 23401 protocol, the Update Bearer Request/Response message, in a corresponding 29274 GTPC interface protocol, is a Modify Bearer Request/Response message.

In the 29274 GTPC interface protocol, the information of information elements (Information Elements, IE) carried in the response message (Modify Bearer Response) corresponding to the TAU flow may be as shown in table 1:

TABLE 1

IE list of Modify Bearer Response message

| Information elements (Information elements) | P | Condition/ comment (Condition/ Comment) | IE type (IE Type) | Instance (Ins.) |
|---|---|---|---|---|
| Cause (Cause) | M | | Cause (Cause) | 0 |
| Mobile station ISDN number (MSISDN) | C | | Mobile station ISDN number (MSISDN) | 0 |
| Linked EPS bearer ID (Linked EPS Bearer ID) | C | | EPS bearer identifier (EBI) | 0 |
| Aggregate maximum bit rate (Aggregate Maximum Bit Rate (APN-AMBR)) | C | | Aggregate maximum bit rate (AMBR) | 0 |
| APN restriction (APN Restriction) | C | | APN restriction (APN Restriction) | 0 |
| Protocol configuration options (Protocol Configuration Options (PCO)) | C | | Protocol configuration options (PCO) | 0 |
| Bearer contexts modified (Bearer Contexts modified) | C | | Bearer context (Bearer Context) | 0 |
| Bearer contexts marked for removal (Bearer Contexts marked for removal) | C | | Bearer context (Bearer Context) | 1 |
| Change reporting action (Change Reporting Action) | C | | Change reporting action (Change Reporting Action) | 0 |
| CSG information reporting action (CSG (Closed Subscriber Group) Information Reporting Action) | CO | | CSG information reporting action (CSG Information Reporting Action) | 0 |
| Charging gateway name (Charging Gateway Name) | C | | Fully qualified domain name (FQDN) | 0 |
| Charging gateway address (Charging Gateway Address) | C | | IP address (IP Address) | 0 |
| PGW fully qualified PDN connection setting identifier (PGW-FQ-CSID) | C | | Fully qualified PDN connection setting identifier (FQ-CSID) | 0 |
| SGW fully qualified PDN connection setting identifier (SGW-FQ-CSID) | C | | Fully qualified PDN connection setting identifier (FQ-CSID) | 1 |
| Recovery (Recovery) | C | | Recovery (Recovery) | 0 |
| Private Extension | O | | Private Extension | vs | wherein, the IE list of IE: Bearer Contexts modified in table 1 may be as shown in table 2:

TABLE 2

IE list of Bearer Contexts modified

| Octets 1 | Bearer Context IE Type = 93 (decimal) |
| Octets 2 and 3 | Length = n |
| Octets 4 | Spare and Instance fields |

| Information elements (Information elements) | P | Condition/ comment (Condition/ Comment) | IE Type (IE Type) | Instance (Ins.) |
|---|---|---|---|---|
| EPS bearer ID (EPS Bearer ID) | M | | EPS bearer identifier (EBI) | 0 |
| Cause (Cause) | M | | Cause (Cause) | 0 |
| S1 interface SGW full tunnel identifier (S1 SGW F-TEID) | C | | Full tunnel identifier (F-TEID) | 0 |
| S12 interface SGW full tunnel identifier (S12SGW F-TEID) | C | | Full tunnel identifier (F-TEID) | 1 |
| S4-U interface SGW full tunnel identifier (S4-USGW F-TEID) | C | | Full tunnel identifier (F-TEID) | 2 |
| Charging ID (Charging ID) | C | | Charging ID (Charging ID) | 0 |
| Bearer flags (Bearer Flags) | CO | | Bearer flags (Bearer Flags) | 0 |

In the process of implementing the present invention, the inventor has found that at least the following defects are present in the prior art:
according to the implementation of the existing protocol, when the UE is reselected or switched from the TD-SCDMA system to the TD-LTE system, in the following application scenarios:
1) when S5/S8 is accessed to a private network, while Gn/Gp is accessed to a public network;
2) when the SGW and the PGW are cooperatively arranged (i.e., no S5/S8 interface is displayed externally), the S5/S8 interface provides an internal IP, and the Gn/Gp interface provides an external IP address.
When the control plane/user plane resources displayed by the S5/S8 interface and the Gn/Gp interface are different, the existing protocol could not support the scenario.

SUMMARY

The purpose of the present invention is to provide a method and device for processing inter-system reselection or switch, for perfecting the scenarios supported by an existing protocol, providing support for reselecting or switching UE from a TD-SCDMA system to a TD-LTE system and processing under scenarios in which an S5/S8 interface and a Gn/Gp interface are in different networks, thus the embodiments of the present invention adopt the following technical solutions:
a switch processing method, including:
receiving, by a packet data network gateway PGW, a modify bearer request message sent by a serving gateway SGW;
obtaining, by the PGW, an S5/S8 interface resource in current bearer context information, updating the current bearer context information according to the modify bearer request message, and obtaining an S5/S8 interface resource in the updated bearer context information;
when the PGW determines that the S5/S8 interface resource changes according to the S5/S8 interface resource in the updated bearer context information and the interface resource in the current bearer context information, sending back, by the PGW, a modify bearer response message carrying the S5/S8 interface resource in the updated bearer context information to the SGW, for enabling the SGW to update the bearer context information according to the modify bearer response message.

A packet data network gateway PGW, including:
a receiving module, configured to receive a modify bearer request message sent by a serving gateway SGW;
a processing module, configured to obtain an S5/S8 interface resource in current bearer context information, update the current bearer context information according to the modify bearer request message, and obtain an S5/S8 interface resource in the updated bearer context information;
a determining module, configured to determine whether the S5/S8 interface resource changes according to the S5/S8 interface resource in the bearer context information updated by the processing module and the interface resource in the current bearer context information;
a sending module, configured to, when the determining module determines that the S5/S8 interface resource changes, send back a modify bearer response message carrying the S5/S8 interface resource in the updated bearer context information to the SGW, for enabling the SGW to update the bearer context information according to the modify bearer response message.

In the above-mentioned embodiments of the present invention, when the PGW receives the modify bearer request message sent by the serving gateway SGW, the PGW obtains the S5/S8 interface resource in the current bearer context information, updates the bearer context information according to the modify bearer request message, and obtains the S5/S8 interface resource in the updated bearer context information; when the PGW determines that the S5/S8 interface resource changes according to the S5/S8 interface resource in the updated bearer context information and the interface resource in the current bearer context information, the PGW sends back the modify bearer response message carrying the S5/S8 interface resource in the updated bearer context information to the SGW, for enabling the SGW to update the bearer context information according to the modify bearer response message, such that the scenarios supported by the existing protocol are perfected, and support is provided for reselecting or switching the UE from the TD-SCDMA system to the TD-LTE system and processing under scenarios in which the S5/S8 interface and the Gn/Gp interface are in different networks.

BRIEF DESCRIPTION OF THE DRAWINGS

To illustrate technical solutions in the embodiments of the present invention or in the prior art more clearly, a brief introduction on the accompanying drawings which are needed in the description of the embodiments or the prior art is given below. Apparently, the accompanying drawings in the description below are merely some of the embodiments of the present invention, based on which other drawings may be obtained by those of ordinary skill in the art without any creative effort.

DETAILED DESCRIPTION OF THE PREFERRED EMBODIMENTS

Aiming at the above-mentioned problems in the prior art, the embodiments of the present invention provide a technical solution of processing inter-system reselection or switch, which is applied to a scenario in which a user is reselected or switched from a TD-SCDMA system to a TD-LTE system. In the technical solution, when a PGW receives a modify bearer request (Modify Bearer Request) message sent by a serving gateway SGW, the PGW obtains an S5/S8 interface resource in current bearer context information, updates the current bearer context information according to the modify bearer request message, and obtains an S5/S8 interface resource in the updated bearer context information; when the PGW determines that the S5/S8 interface resource changes according to the S5/S8 interface resource in the updated bearer context information and the interface resource in the current bearer context information, the PGW sends back a modify bearer response (Modify Bearer Response) message carrying the S5/S8 interface resource in the updated bearer context information to the SGW, for enabling the SGW to update the bearer context information according to the modify bearer response message, such that the scenarios supported by the existing protocol are perfected.

A clear and complete description of technical solutions in the present application will be given below in combination with the accompanying drawings in the present application. Apparently, the embodiments described are merely a part, but not all, of the embodiments of the present invention. All of other embodiments, obtained by those of ordinary skill in the art based on the embodiments of the present application without any creative effort, fall into the protection scope of the present application.

Figure 3:
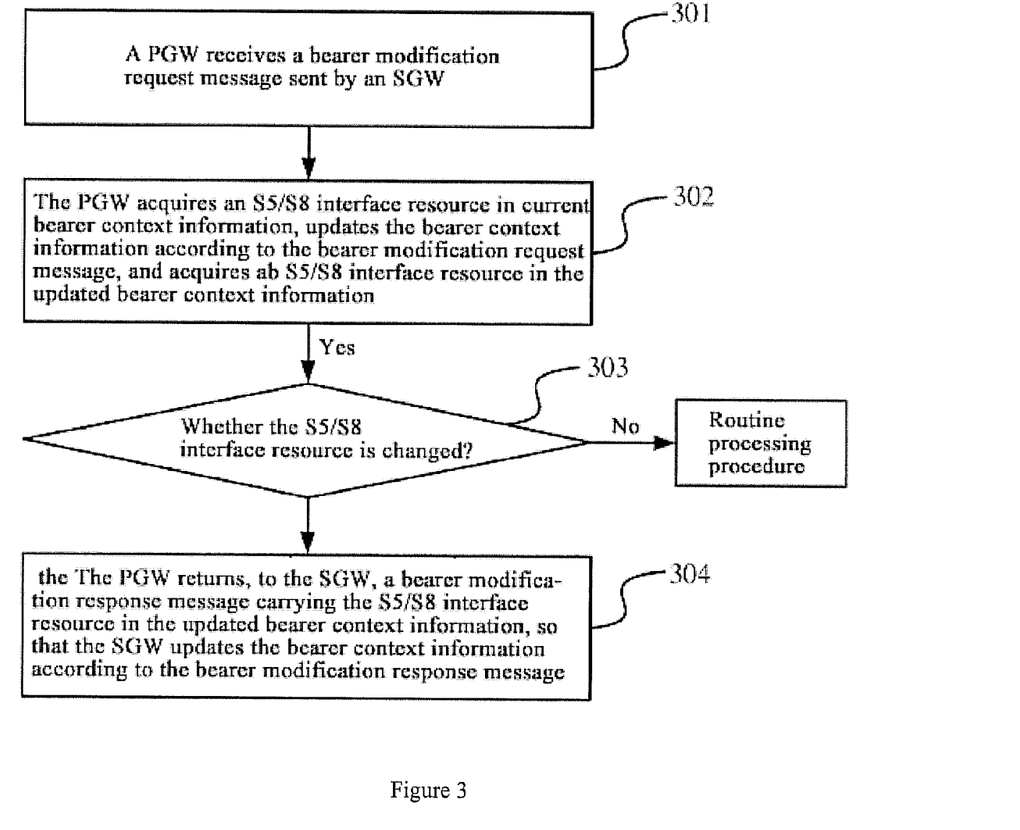
FIG. 3 is a schematic diagram of a flow of a processing method for reselecting or switching a user from a TD-SCDMA system to a TD-LTE system provided by an embodiment of the present invention.

As shown in FIG. 3, it is a schematic diagram of a flow of a processing method for reselecting or switching a user from a TD-SCDMA system to an LTE system provided by an embodiment of the present invention, and the method may include the following steps:

Step 301. the PGW receives a modify bearer request message sent by the SGW.

Specifically, when the user is reselected from the TD-SCDMA system to the TD-LTE system, an MME will send a create session request (Create Session Request) message to the SGW, to request to create a new session; when the user is switched from the TD-SCDMA system to the TD-LTE system, the MME will send the modify bearer request (Modify Bearer Request) message to the SGW.

After receiving the create session request message or the modify bearer request message, the SGW sends the modify bearer request message to the PGW, for notifying the PGW of UE position information and RAT type change. Wherein, the modify bearer request message carries an SGW address, a TEID of the SGW side and a RAT type.

Step 302. the PGW obtains an S5/S8 interface resource in current bearer context information, updates the current bearer context information according to the modify bearer request message, and obtains an S5/S8 interface resource in the updated bearer context information.

Specifically, after receiving the modify bearer request message sent by the SGW, the PGW may obtain the S5/S8 interface resource from the bearer context information currently stored therein, update the bearer context information currently stored therein according to the modify bearer request message and obtain the S5/S8 interface resource in the updated bearer context information.

Wherein, besides the S5/S8 interface resource information, the bearer context information may further include UE position information, UE access network type information, PDN IP, APN (Access Point Name, access point name), bearer number information corresponding to a bearer list and the like.

It should be noted that, when a dynamic PCC rule is configured in the network and the PGW needs to notify the PCRF of the UE position information and the RAT type information, the PGW triggers an IP-CAN session modification flow to notify the PCRF of the UE position information and the RAT type information.

Step 303. the PGW determines whether the S5/S8 interface resource changes according to the S5/S8 interface resource in the updated bearer context information and the interface resource in the current bearer context information. If so, step 304 is implemented; if not, conventional processing is performed.

Specifically, after receiving the modify bearer request message sent by the SGW, the PGW needs to obtain the S5/S8 interface resource in the current bearer context information, update a bearer context according to related information carried in the modify bearer request message and obtain the S5/S8 interface resource (including an S5/S8 control plane IP address and TEIDC and a user plane IP address and TEIDU) in the updated bearer context information, so as to determine whether the S5/S8 interface resource changes according to the S5/S8 interface resource in the updated bearer context information and the interface resource in the current bearer context information (i.e., bearer context information before being updated), and when determining that the S5/S8 interface resource changes, the PGW sends back a modify bearer response message carrying the updated S5/S8 interface resource (i.e., the obtained S5/S8 interface resource) to the SGW; if not, the conventional processing is performed according to the existing protocol.

Wherein, the S5/S8 interface resource may include:
a control plane IP address and TEIDC of the S5/S8 interface, and a user plane IP address and TEIDU of the S5/S8 interface.

Step 304. the PGW sends back the modify bearer response message carrying the S5/S8 interface resource in the updated bearer context information to the SGW, for enabling the SGW to update the bearer context information according to the modify bearer response message Specifically, in the technical solution provided by the embodiment of the present invention, after the PGW determines that the S5/S8 interface resource changes, the PGW may carry the S5/S8 interface resource in the updated context (i.e., the obtained S5/S8 interface resource) in the modify bearer response message sent back to the SGW, and the specific implementation may include the following several conditions:

condition 1. when the control plane IP address and the TEIDC of the S5/S8 interface change, the PGW sends back the modify bearer response message carrying the control plane IP address and the TEIDC of the S5/S8 interface to the SGW;

condition 2. when the user plane IP address and the TEIDU of the S5/S8 interface change, the PGW sends back the modify bearer response message carrying the user plane IP address and the TEIDU of the S5/S8 interface to the SGW;

condition 3. when the user plane IP address and the TEIDU of the S5/S8 interface change, and when the control plane IP address and the TEIDC change, the PGW sends back the modify bearer response message carrying the user plane IP address and the TEIDU of the S5/S8 interface and the control plane IP address and the TEIDC to the SGW.

Wherein, in the embodiment of the present invention, the modify bearer response message may be expanded for adding an IE used for carrying the control plane IF address and the TEIDC of the S5/S8 interface, and/or an IE used for carrying the user plane IP address and the TEIDU. Specifically:

when the control plane IP address and the TEIDC of the S5/S8 interface change, the PGW adds a first IE used for carrying the control plane IP address and the TEIDC of the S5/S8 interface in the modify bearer response message sent back to the SGW;

when the user plane IP address and the TEIDU of the S5/S8 interface change, the PGW adds a second IE used for carrying the user plane IP address and the TEIDU of the S5/S8 interface in the modify bearer response message sent back to the SGW;

when the user plane IF address and the TEIDU of the S5/S8 interface change, and when the control plane IP address and the TEIDC change, the PGW adds the first information element IE used for carrying the control plane IP address and the TEIDC of the S5/S8 interface and the second information element IE used for carrying the user plane IP address and the TEIDU of the S5/S8 interface in the modify bearer response message sent back to the SGW.

Wherein, in the embodiment of the present invention, the IE list of the expanded modify bearer response message is as shown in table 3:

TABLE 3

IE list of expanded modify bearer response message

| Information elements (Information elements) | P | Condition/ comment (Condition/ Comment) | IE type (IE Type) | Instance (Ins.) |
| --- | --- | --- | --- | --- |
| Cause (Cause) | M | | Cause (Cause) | 0 |
| Mobile station ISDN number (MSISDN) | C | | Mobile station ISDN number (MSISDN) | 0 |
| Linked EPS bearer ID (Linked EPS Bearer ID) | C | | EPS bearer identifier (EBI) | 0 |
| PGW S5/S8 interface control plane full tunnel identifier (PGW S5/S8 F-TEID for | C | TAU/Handover flow, needing to be carried when PGW S5/S8 F-TEID changes | Full tunnel identifier (F-TEID) | 0 |

TABLE 3-continued

IE list of expanded modify bearer response message

| Information elements (Information elements) | P | Condition/ comment (Condition/ Comment) | IE type (IE Type) | Instance (Ins.) |
|---|---|---|---|---|
| PMIP based interface or for GTP based Control Plane interface (i.e., PGW-FTEIDC)) | | | | |
| Aggregate maximum bit rate (Aggregate Maximum Bit Rate (APN-AMBR)) | C | | Aggregate maximum bit rate (AMBR) | 0 |
| APN restriction (APN Restriction) | C | | APN restriction (APN Restriction) | 0 |
| Protocol configuration options (Protocol Configuration Options (PCO)) | C | | Protocol configuration options (PCO) | 0 |
| Bearer contexts modified (Bearer Contexts modified) | C | | Bearer context (Bearer Context) | 0 |
| Bearer contexts marked for removal (Bearer Contexts marked for removal) | C | | Bearer context (Bearer Context) | 1 |
| Change reporting action (Change Reporting Action) | C | | Change reporting action (Change Reporting Action) | 0 |
| CSG information reporting action (CSG (Closed Subscriber Group) Information Reporting Action) | CO | | CSG information reporting action (CSG Information Reporting Action) | 0 |
| Charging gateway name (Charging Gateway Name) | C | | Fully qualified domain name (FQDN) | 0 |
| Charging gateway address (Charging Gateway Address) | C | | IP address (IP Address) | 0 |
| PGW fully qualified PDN connection setting identifier (PGW-FQ-CSID) | C | | Fully qualified PDN connection setting identifier (FQ-CSID) | 0 |
| SGW fully qualified PDN connection setting identifier (SGW-FQ-CSID) | C | | Fully qualified PDN connection setting identifier (FQ-CSID) | 1 |
| Recovery (Recovery) | C | | Recovery (Recovery) | 0 |
| Private Extension | O | | Private Extension | vs |

Wherein, the IE list of IE: Bearer Contexts modified in table 3 is as shown in table 4:

TABLE 4

IE list of Bearer Contexts modified

| Octets 1 | Bearer Context IE Type = 93 (decimal) |
| Octets 2 and 3 | Length = n |
| Octets 4 | Spare and Instance fields |

| Information elements(Information elements) | P | Condition/ comment (Condition/ Comment) | IE type (IE Type) | Instance (Ins.) |
|---|---|---|---|---|
| EPS bearer ID (EPS Bearer ID) | M | | EPS bearer identifier (EBI) | 0 |

TABLE 4-continued

| IE list of Bearer Contexts modified | | | |
|---|---|---|---|
| Cause (Cause) | M | Cause (Cause) | 0 |
| S1 interface SGW full tunnel identifier (S1 SGW F-TEID) | C | Full tunnel identifier (F-TEID) | 0 |
| S12 interface SGW full tunnel identifier (S12 SGW F-TED) | C | Full tunnel identifier (F-TEID | 1 |
| S4-U interface SGW full tunnel identifier (S4-U SGW F-TEID) | C | Full tunnel identifier (F-TEID) | 2 |
| S5/S8-U interface PGW full tunnel identifier (S5/S8-U PGW F-TEID (i.e., PGW-FTEIDU)) | C | TAU/Handover flow, needing to be carried when PGW S5/S8-U F-TEID changes | Full tunnel identifier (F-TEID) | 3 |
| Charging ID (Charging ID) | C | Charging ID (Charging ID) | 0 |
| Bearer flags (Bearer Flags) | CO | Bearer flags (Bearer Flags) | 0 |

Wherein, the PGW-FTEIDC is used for carrying the control plane IP address and the TEIDC of the S5/S8 interface when the control plane IP address and the TEIDC of the S5/S8 interface change; the PGW-FTEIDU is used for carrying the user plane IP address and the TEIDU of the S5/S8 interface when the user plane IP address and the TEIDU of the S5/S8 interface change.

Wherein, the IE types of the PGW-FTEIDC and the PGW-FTEIDU are F-TEID, and the structure thereof may be as shown in table 5:

TABLE 5 structure of F-TEID

| | Bits | | | | | | | |
|---|---|---|---|---|---|---|---|---|
| Octets | 8 | 7 | 6 | 5 | 4 | 3 | 2 | 1 |
| 1 | Type (Type) = 87 (decimal) | | | | | | | |
| 2 to 3 | Length (Length) = n | | | | | | | |
| 4 | Spare (Spare) | | | | instance (Instance) | | | |
| 5 | V4 | | V6 | | Spare | | Interface type (Interface type) | |
| 6 to 9 | Tunnel identifier (TEID/GREKey) | | | | | | | |
| m to (m + 3) | IPv4 address (IPv4 address) | | | | | | | |
| p to (P + 15) | IPv6 address (IPv6 address) | | | | | | | |
| k to (n + 4) | These octet(s) is/are present only if explicitly specified | | | | | | | |

Wherein, IPv4 address carries a V4 address, and V4 is set as 1; the IPv6 address carries a V6 address, and V6 is set as 1.

It can be seen from the description above that, in the technical solution provided by the embodiment of the present invention, when the PGW receives the modify bearer request message sent by the serving gateway SGW, the PGW obtains the S5/S8 interface resource in the current bearer context information, updates the current bearer context information according to the modify bearer request message, and obtains the S5/S8 interface resource in the updated bearer context information; when the PGW determines that the S5/S8 interface resource changes according to the S5/S8 interface resource in the updated bearer context information and the interface resource in the current bearer context information, the PGW sends back the modify bearer response message carrying the S5/S8 interface resource in the updated bearer context information to the SGW, for enabling the SGW to update the bearer context information according to the modify bearer response message, such that the scenarios supported by the existing protocol are perfected, and support is provided for reselecting or switching the UE from the TD-SCDMA system to the TD-LTE, system and processing under scenarios in which the S5/S8 interface and the Gn/Gp interface are in different networks.

Based on the same technical concept as the above-mentioned method flow, the embodiment of the present invention further provides a PGW, which may be applied to the above-mentioned method embodiment.

Figure 4:
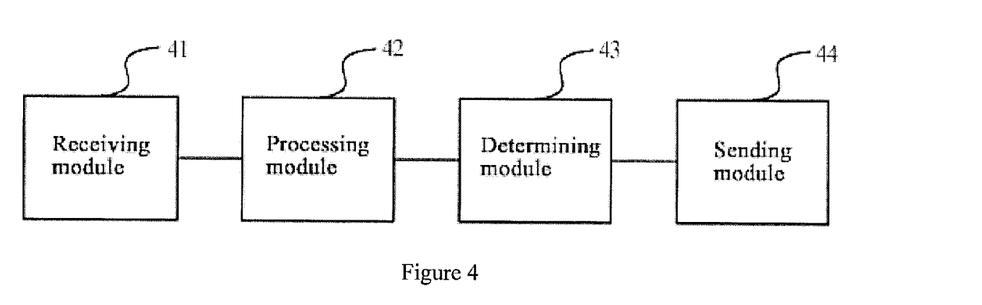
FIG. 4 is a schematic diagram of a structure of a PGW provided by an embodiment of the present invention.

As shown in FIG. 4, it is a schematic diagram of a structure of a PGW provided by an embodiment of the present invention, including:

a receiving module 41, configured to receive a modify bearer request message sent by a serving gateway SGW;

a processing module 42, configured to obtain an S5/S8 interface resource in current bearer context information, update the current bearer context information according to the modify bearer request message, and obtain an S5/S8 interface resource in the updated bearer context information;

a determining module 43, configured to determine whether the S5/S8 interface resource changes according to the S5/S8 interface resource in the updated bearer context information and the interface resource in the current bearer context information;

a sending module 44, configured to, when the determining module 43 determines that the S5/S8 interface resource changes, send back a modify bearer response message carrying the S5/S8 interface resource in the updated bearer context information to the SGW, for enabling the SGW to update the bearer context information according to the modify bearer response message.

Wherein, the S5/S8 interface resource includes:

a control plane IP address and a control plane tunnel endpoint identifier TEIDC of the S5/S8 interface, and a user plane IP address and a user plane tunnel endpoint identifier TEIDU of the S5/S8 interface.

Wherein, the sending module 44 is specifically configured to, when the control plane IP address and the TEIDC of the S5/S8 interface change, send back the modify bearer response message carrying the control plane IP address and the TEIDC of the S5/S8 interface to the SGW;

when the user plane IP address and the TEIDU of the S5/S8 interface change, send back the modify bearer response message carrying the user plane IP address and the TEIDU of the S5/S8 interface to the SGW;

when the user plane IP address and the TEIDU of the S5/S8 interface change, and when the control plane IP address and the TEIDC change, send back the modify bearer response message carrying the user plane IP address and the TEIDU of the S5/S8 interface and the control plane IP address and the TEIDC to the SGW.

Wherein, the sending module 44 is specifically configured to, when the control plane IP address and the TEIDC of the S5/S8 interface change, add a first information element IE used for carrying the control plane IP address and the TEIDC of the S5/S8 interface in the modify bearer response message sent back to the SGW;

when the user plane IP address and the TEIDU of the S5/S8 interface change, add a second IE used for carrying the user plane IP address and the TEIDU of the S5/S8 interface in the modify bearer response message sent back to the SGW;

when the user plane IP address and the TEIDU of the S5/S8 interface change, and when the control plane IP address and the TEIDC change, add the first information element IE used for carrying the control plane IP address and the TEIDC of the S5/S8 interface and the second IE used for carrying the user plane IP address and the TEIDU of the S5/S8 interface in the modify bearer response message sent back to the SGW.

By means of the above-mentioned descriptions, those skilled in the art may clearly understand that the present invention may be implemented by software plus a necessary universal hardware platform, and may also be implemented by hardware, but under most conditions, the former is a better implementation. Based on this understanding, the technical solutions in the present invention essentially or the part contributing to the prior art may be embodied in the form of a software product, the computer software product may be stored in a storage medium, and include several instructions for instructing a terminal device (may be a mobile phone, a personal computer, a server, or a network device and the like) to perform the methods in the embodiments of the present invention.

The foregoing descriptions are merely preferred embodiments of the present invention, it should be noted that, those of ordinary skill in the art may make various improvements and modifications on the premise of not deviating from the principle of the present invention, and these improvements and modifications shall fall within the protection scope of the present invention.

The invention claimed is:

1. A method for processing inter-system reselection or switch, comprising:
   (a) receiving, by a packet data network gateway PGW a modify bearer request message sent by a serving gateway SGW;
   (b) obtaining, by the PGW, an S5/S8 interface resource in current bearer context information, updating the current bearer context information according to the modify bearer request message, and obtaining an S5/S8 interface resource in the updated bearer context information;
   (c) determining, by the PGW, whether the S5/S8 interface resource in the current bearer context information changes according to the S5/S8 interface resource in the updated bearer context information and the S5/S8 interface resource in the current bearer information, and upon determining that the S5/S8 interface resource in the current bearer context information changes, sending back, by the PGW, a modify bearer response message carrying the changed S5/S8 interface resource in the updated bearer context information to the SGW, for enabling the SGW to update the bearer context information according to the modify bearer response message, wherein the S5/S8 interface resource in the updated bearer context information comprises: a control plane IP address and a control plane tunnel endpoint identifier TEIDC of an S5/S8 interface, and a user plane IP address and a user plane tunnel endpoint identifier TEIDU of the S5/S8 interface, and wherein the sending back, by the PGW, of the modify bearer response message carrying the changed S5/S8 interface resource in the updated bearer context information to the SGW specifically comprises:

(c1) determining whether the control plane IP address and the TEIDC of the S5/S8 interface change, and upon determining that the control plane IP address and the TEIDC of the S5/S8 interface change, sending back, by the PGW, the modify bearer response message carrying the changed control plane IP address and the changed TEIDC of the changed S5/S8 interface to the SGW, and adding, by the PGW, a first information element IE used for carrying the changed control plane IP address and the changed TEIDC of the changed S5/S8 interface in the modify bearer response message sent back to the SGW;

(c2) determining whether the user plane IP address and the TEIDU of the S5/S8 interface change, and upon determining that the user plane IP address and the TEIDU of the S5/S8 interface change, sending back, by the PGW, the modify bearer response message carrying the changed user plane IP address and the changed TEIDU of the changed S5/S8 interface to the SGW, and adding, by the PGW, a second information element IE used for carrying the changed user plane IP address and the changed TEIDU of the changed S5/S8 interface in the modify bearer response message sent back to the SGW;

(c3) upon determining that the user plane IP address and the TEIDU of the S5/S8 interface change, and upon determining that the control plane IP address and the TEIDC change, sending back, by the PGW, the modify bearer response message carrying the changed user plane IP address and the changed TEIDU of the changed S5/S8 interface and the changed control plane IP address and the changed TEIDC of the changed S5/S8 interface to the SGW, and adding, by the PGW, the first information element IE used for carrying the changed control plane IP address and the changed TEIDC of the changed S5/S8 interface and the second information element IE used for carrying the changed user plane IP address and the changed TEIDU of the changed S5/S8 interface in the modify bearer response message sent back to the SGW.

2. A packet data gateway PGW, comprising:
   a non-transitory computer-readable medium tangibly embodying executable instructions that, when executed by a processor of the packet data gateway PGW, cause the processor to implement:
   a receiving module, configured to receive a modify bearer request message sent by a serving gateway SGW;
   a processing module, configured to obtain an S5/S8 interface resource in current bearer context information, update the current bearer context information according to the modify bearer request message, and obtain an S5/S8 interface resource in the updated bearer context information;

a determining module, configured to determine whether the S5/S8 interface resource in the current bearer context information changes according to the S5/S8 interface resource in the updated bearer context information and the interface resource in the current bearer context information; and a sending module, configured to, upon the determining module determining that the S5/S8 interface resource in the current bearer context information changes, send back a modify bearer response message carrying the changed S5/S8 interface resource in the updated bearer context information to the SGW, for enabling the SGW to update the bearer context information according to the modify bearer response message, wherein the S5/S8 interface resource in the updated bearer context information comprises: a control plane IP address and a control plane tunnel endpoint identifier TEIDC of the S5/S8 interface, and a user plane IP address and a user plane tunnel endpoint identifier TEIDU of the S5/S8 interface, wherein the sending module is specifically configured to:

(i) determine whether the control plane IP address and the TEIDC of the S5/S8 interface change, and upon determining that the control plane IP address and the TEIDC of the S5/S8 interface change, send back the modify bearer response message carrying the changed control plane IP address and the changed TEIDC of the changed S5/S8 interface to the SGW, and (b) add a first information element IE used for carrying the changed control plane IP address and the changed TEIDC of the changed S5/S8 interface in the modify bearer response message sent back to the SGW;

(ii) determine whether the user plane IP address and the TEIDU of the S5/S8 interface change, and upon determining that the user plane IP address and the TEIDU of the S5/S8 interface change, send back the modify bearer response message carrying the changed user plane IP address and the changed TEIDU of the changed S5/S8 interface to the SGW, and add a second information element IE used for carrying the changed user plane IP address and the changed TEIDU of the changed S5/S8 interface in the modify bearer response message sent back to the SGW;

(iii) upon determining that the user plane IP address and the TEIDU of the S5/S8 interface change, and upon determining that the control plane IP address and the TEIDC change, send back the modify bearer response message carrying the changed user plane IP address and the changed TEIDU of the changed S5/S8 interface and the changed control plane IP address and the changed TEIDC of the changed S5/S8 interface to the SGW, and add the first information element IE used for carrying the changed control plane IP address and the changed TEIDC of the changed S5/S8 interface and the second information element IE used for carrying the changed user plane IP address and the changed TEIDU of the changed S5/S8 interface in the modify bearer response message sent back to the SGW.

* * * * *